US007844038B2

(12) United States Patent
Yau et al.

(10) Patent No.: US 7,844,038 B2
(45) Date of Patent: Nov. 30, 2010

(54) SYSTEMS, METHODS AND APPARATUS FOR TRACKING ON-CALL ACTIVITY

(75) Inventors: Debbie M. Y. Yau, Seattle, WA (US); Felix Gti Andrew, Seattle, WA (US); Susan Pappalardo, Kirkland, WA (US); Joel P. Dehlin, Redmond, WA (US); Andy Seres, Redmond, WA (US); Andy Padawer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 966 days.

(21) Appl. No.: 11/672,740

(22) Filed: Feb. 8, 2007

(65) Prior Publication Data

US 2007/0127684 A1    Jun. 7, 2007

Related U.S. Application Data

(63) Continuation of application No. 10/147,273, filed on May 15, 2002, now Pat. No. 7,180,987.

(51) Int. Cl.
    *H04M 1/64* (2006.01)
(52) U.S. Cl. .............................. 379/88.26; 379/215.01; 379/221.09; 455/422.1; 455/453; 455/560; 705/32; 709/204; 709/217; 718/104
(58) Field of Classification Search .............. 379/88.01, 379/88.26, 215.01, 221.09; 455/3.04, 422.1, 455/453, 560; 709/204, 217; 705/32; 718/104
    See application file for complete search history.

(56) References Cited

U.S. PATENT DOCUMENTS

| 5,546,447 | A | 8/1996 | Skarbo et al. |
|---|---|---|---|
| 5,754,636 | A | 5/1998 | Bayless et al. |
| 5,815,556 | A | 9/1998 | Thuresson et al. |
| 6,317,491 | B1 | 11/2001 | Chang et al. |
| 6,327,606 | B1 * | 12/2001 | Chidambaran ............... 718/104 |
| 6,438,216 | B1 * | 8/2002 | Aktas ....................... 379/88.01 |
| 6,445,781 | B1 | 9/2002 | Heinmiller et al. |
| 6,553,222 | B1 | 4/2003 | Weiss |
| 6,633,635 | B2 * | 10/2003 | Kung et al. ............. 379/215.01 |
| 6,909,910 | B2 | 6/2005 | Pappalardo et al. |
| 6,917,613 | B1 | 7/2005 | Tiburtius et al. |
| 7,180,987 | B2 * | 2/2007 | Yau et al. .................. 379/88.26 |

(Continued)

OTHER PUBLICATIONS

"Multimedia Telephone Call Recognition", IBM Technical Disclosure Bulletin, IBM Corp., New York, NY, US, vol. 34, No. 10A, Mar. 1, 1992, pp. 315-316.

*Primary Examiner*—Gerald Gauthier
(74) *Attorney, Agent, or Firm*—Lee & Hayes, PLLC

(57) ABSTRACT

A first electronic device engages in a voice communication with another electronic device. The voice communication is associated with data stored by the first electronic device. In some instances, the data is generated the first electronic device or received by the first electronic device from the second electronic device in response to, or as a consequence of the voice of the voice communication. During the voice communication, or sometime after the voice communication is terminated, the first electronic device determines that the data is associated with the voice communication. The data is then made available to an application program, so that the data can be associated with other data. Thus, a human user of the first electronic device is relieved of identifying data within a context, and relieved of the task associating the data with other data.

20 Claims, 6 Drawing Sheets

U.S. PATENT DOCUMENTS

| | | | |
|---|---|---|---|
| 7,366,521 B2 * | 4/2008 | Collins | 455/453 |
| 2002/0012425 A1 | 1/2002 | Brisebois et al. | |
| 2003/0033226 A1 * | 2/2003 | Anderson | 705/32 |
| 2003/0125085 A1 * | 7/2003 | Collins | 455/560 |
| 2003/0176163 A1 * | 9/2003 | Gosewehr | 455/3.04 |
| 2003/0215064 A1 * | 11/2003 | Yau et al. | 379/67.1 |
| 2004/0010549 A1 * | 1/2004 | Matus et al. | 709/204 |
| 2007/0127684 A1 * | 6/2007 | Yau et al. | 379/221.09 |
| 2008/0005271 A1 * | 1/2008 | Baluja et al. | 709/217 |
| 2010/0087185 A1 * | 4/2010 | Hawkins et al. | 455/422.1 |

* cited by examiner

SYSTEMS, METHODS AND APPARATUS FOR TRACKING ON-CALL ACTIVITY

RELATED APPLICATIONS

This continuation application claims priority to U.S. patent application Ser. No. 10/147,273 to be issued as U.S. Pat. No. 7,180,987 to Yau et al., entitled, "System, Methods, and Apparatus for Tracking On-Call Activity," filed May 15, 2002, and incorporated herein by reference.

TECHNICAL FIELD

This invention relates to voice call records, and more particularly to identifying and sharing data related to a voice call.

BACKGROUND

In conventional systems, a human caller using a first mobile voice communication device makes voice contact in a voice call to a second mobile voice communication device. The mobile communication devices include cellular phones and personal digital assistants (PDA). The second communication device captures and stores information associated with the voice call in a voice call log. The information includes caller identification (ID) data, and the date/time of the contact phone numbers. However, this information is used in only the most rudimentary ways, such as providing security authentication of the human caller, and providing a basic journal of voice call activity between the second communication device and the human.

To meet increasing demand for a multi-functional communication device, manufacturers of mobile voice communication devices are continually adding additional applications to the mobile voice communication devices. As a result, mobile voice communication devices are increasingly becoming more than just wireless telephones. Rather, in addition to handling voice data, some mobile telephones have a display unit to display graphical data to support email, Web browsing, and other non-voice features. The application programs operating on the mobile voice communication devices also provide the ability to capture and store information associated with a voice call. Examples of information associated with a voice call include the telephone number of the second communication device and the date/time of the voice call. In one example, the voice call information is stored to a call log operating on the mobile voice communication device.

For the reasons stated above, and for other reasons stated below which will become apparent to those skilled in the art upon reading and understanding the present specification, there is a need in the art for an improved means of associating data sets that are associated with a voice call.

SUMMARY

A first electronic device engages in a voice communication with another electronic device. The voice communication is associated with data generated and/or stored by one or the other of the electronic devices. In some instances, the first electronic device generates the data. In other instances, the first electronic device receives the data from the second electronic device. During the voice communication, or sometime after the voice communication is terminated, the first electronic device determines that certain data is associated with the voice communication. In a described embodiment, this determination is made by identifying data that is accessed or otherwise used within the context of the voice call. The identified data is then made available to application programs executing on the first electronic device, so that the data can be associated with other data. Thus, a human user of the first electronic device is relieved of the task of identifying data within a context, and relieved of the task of associating the data with other data.

DETAILED DESCRIPTION

The following description sets forth a specific embodiment of on-call tracking that incorporates elements recited in the appended claims. The embodiment is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

The detailed description is divided into four sections. In the first section, a system level overview is presented. The second section describes apparatus, hardware and an operating environment in conjunction with which embodiments may be practiced. In the third section, methods for an embodiment are provided. Finally, in the fourth section, a conclusion of the detailed description is provided.

System Level Overview

Figure 1:
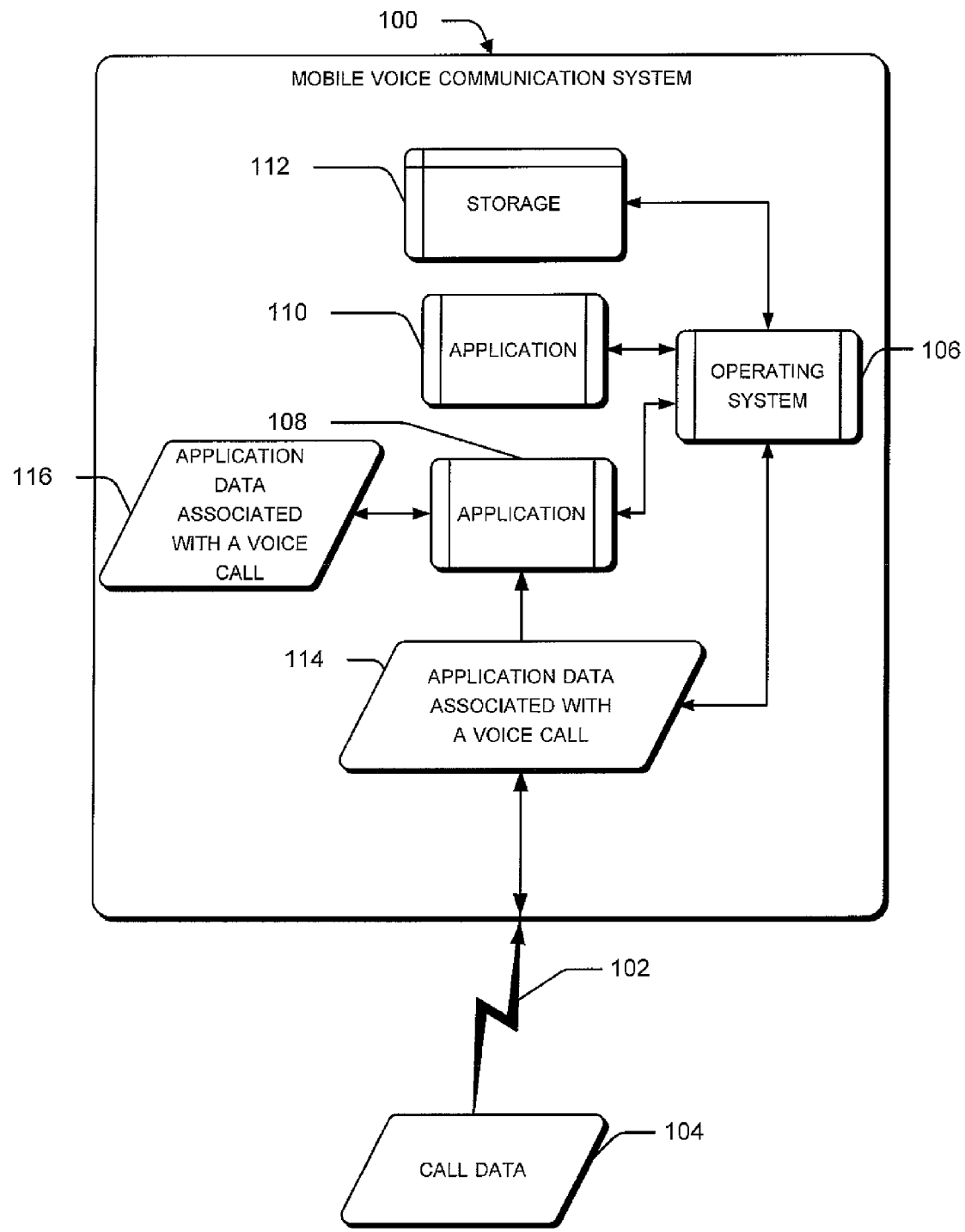
FIG. 1 is a block diagram that provides a system level overview of a mobile voice communication system that shares data that is associated with a voice call.

FIG. 1 is a block diagram that provides a system level overview of a mobile voice communication system 100 that shares data that is associated with a voice call. The mobile voice communication system 100 manages both voice and data information. One example of a suitable mobile voice communication system 100 is a personal digital assistant (PDA) that supports wireless voice and/or data communications, such as a PDA operating "Pocket PC Phone Edition" software. Another example of a suitable mobile voice communication system 100 is a programmable web-enabled cellular phone, such as the Microsoft® Smartphone. In one embodiment of a programmable web-enabled cellular phone, the phone implements Personal Communications Services (PCS) of cellular communications services that combine voice, data, and paging features into a single device.

The mobile voice communication system 100 communicates through an external voice channel 102. The voice communication system 100 is also capable of receiving voice call data 104 through a cellular connection from a cellular network. The voice call data 104 includes caller identification information (e.g. caller ID) and date/time data.

The mobile voice communication system 100 has an open platform operating system (OS) 106. An open hardware architecture (not shown) supports OS 106. The operating system 106, in one embodiment, is the "Pocket PC Phone Edition" brand operating system commercially available from Microsoft® Corporation. The operating system 106, in another embodiment, is the "Windows CE" brand operating system commercially available from Microsoft® Corporation.

The mobile voice communication system 100 also has one or more application(s), 108 and 110, that are operable in conjunction with the OS 106. The (OS) 106 supports multiple different application(s) 108 and 110, which may ship as part of the device or which may be supplied by a third-party software vendor and installed by the end-user after purchase of the system 100. For instance, the OS 106 can support application(s), 108 and 110, pertaining to entertainment, navigation, communications, security, diagnostics, and others. In one implementation, the OS 106 is a multitasking operating system capable of concurrently running multiple application(s) 108 and 110.

The mobile voice communication system 100 has one or more storage is device(s) 112 (e.g., random access memory (RAM), hard disk, diskette, cassette, or smart card). The storage device(s) 112 permit application(s), 108 and 110, from a source (e.g., Internet website, hard disk, CD, diskette, cassette, or smart card) to be stored on the mobile voice communication system 100. In this manner, additional application(s) can be added to the mobile voice communication system 100.

The mobile voice communication system 100 also has application data 114. The application data 114 is associated with one or more applications 108 and/or 110. In accordance with techniques which will be described in more detail below, the application data 114 data can also be associated with a voice call.

In order to determine whether to associate data with a particular voice call, mobile voice communications system 100 evaluates the context of the voice call.

The context is determined from a set of facts or circumstances that surround a voice call. The facts or circumstances include those applications that are operating within a temporal relationship of the voice call. The facts or circumstances also include the application data 114 that is accessed within a temporal relationship of a voice call. The facts or circumstances also include the voice call data 104. Data and operations having a substantial relationship to each other are within an overlapping context. One example of a substantial relationship between data that falls within a context is data objects that include the same date.

The temporal relationship of a voice call is determined from a timeframe in reference to a duration of the voice call. In one example, the temporal relationship is determined from the time during a voice call. In another example, the temporal relationship is determined from the time during a voice call and a predetermined amount of time before and/or after the voice call.

Application data within a context 114 includes different data items that are generated during a voice call, or accessed or referenced during the voice call, and/or that are related to the voice call data 104. Examples of such application data 114 include documents, web pages and/or e-mails that are generated, accessed and/or referenced during the voice call. Application data within a context 114 also includes data that is generated as a consequence of the voice call.

The application data 114 is shared with an application, such as application 108, that is operable on mobile voice communication system 100. The application data 114 on the mobile voice communication system 100 can also be shared with application 110 that is operable on the mobile voice communication system 100.

Mobile voice communication system 100 also has application data 116 that is associated with one or more voice calls other than the particular voice call with which data 114 is associated. As already described, this data is determined to be associated with the different voice calls by virtue of being generated or accessed within the context of those voice calls.

Application 108 manages application data. If application data 116 is within an overlapping context as application data 114, the application 108 associates application data 114 and application data 116. Providing association between it application data having the same or overlapping context leverages the usefulness of the application data within a temporal relationship to a voice call. Thus, association between previously unlinked and unassociated application data 114 and 116 is provided that would otherwise need to be associated with a series of actions by a human user of the mobile voice communication system 100. The mobile voice communication system 100 might receive or generate application data 114 and 116 after the voice call begins or completes. In this case, the application data 114 and 116 are associated with the voice call data 104 after the voice call begins or completes. More specifically, the voice call data 104 is stored or retained after the voice call begins or completes. The stored voice call data 104 allows the voice call data to be associated with application data 114 or 116.

Furthermore, application data that has overlapping contexts need not reside on the same mobile voice communication system 100 to be associated by an application. In some implementations, the application data that have overlapping contexts reside on separate mobile voice communication systems (not shown), and an application residing on one of the separate mobile voice communication systems associates application data that have overlapping contexts. Thus, a mobile voice communication system 100 shares application data 114 with any number of applications that manage application data that have overlapping contexts as the application data 114, regardless of whether the application and the application data reside on the same mobile voice communication system 100 or another mobile voice communication system. This will be described in more detail below, with reference to FIG. 3.

Certain aspects of an exemplary embodiment have been described above in the environment of a simplified mobile voice communication system. However, it should be recognized that the invention is not limited to any particular mobile voice communication system, voice channel, application data, voice call data, or context.

Apparatus

Figure 2:
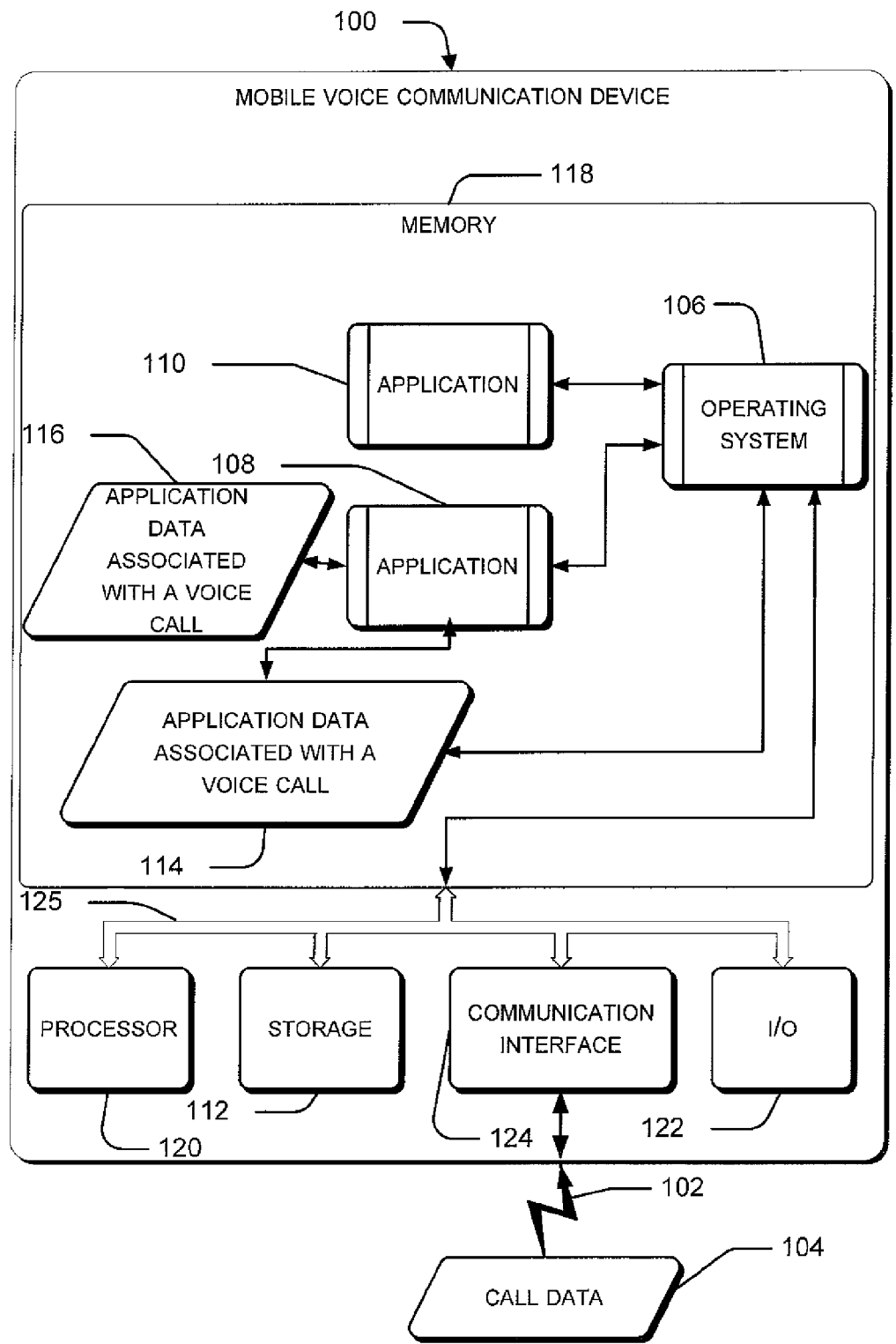
FIG. 2 is a more detailed block diagram of the mobile voice communication system that shares data that is associated with a voice call.

FIG. 2 is a more detailed block diagram of the mobile voice communication system 100 that shares data associated with a voice call. The mobile voice communication device 100 has a memory 118. The memory 118 can be implemented as nonvolatile electronic memory such as a random access memory (RAM) with a battery back-up module (not shown) such that information stored in the memory 118 is not lost when the general power to mobile voice communication device 100 is shut down. The memory 118 stores the open platform operating system (OS) 106, the one or more application(s), 108 and 110, and the application data associated with one or more voice calls. As described above, application data is associated with voice calls by determining whether the application data occurs or is used in some way within the contexts of the voice calls. In some embodiments, each unique context is identified by a globally unique (GUID, not shown) that is managed by the OS 106.

The mobile voice communication device 100 includes a microprocessor 120. The operating system 106 and applications 108 and 110 are executed by the microprocessor 120.

The mobile voice communication device 100 has input/output (I/O) component(s) 122 (e.g. a keyboard, and/or a touch sensitive display) and a communication interface 124. In one embodiment, memory 118, storage device(s) 112, microprocessor 120, input/output (I/O) component(s) 122, and communication interface 124 are coupled for communication with one another over a suitable bus 125.

Figure 3:
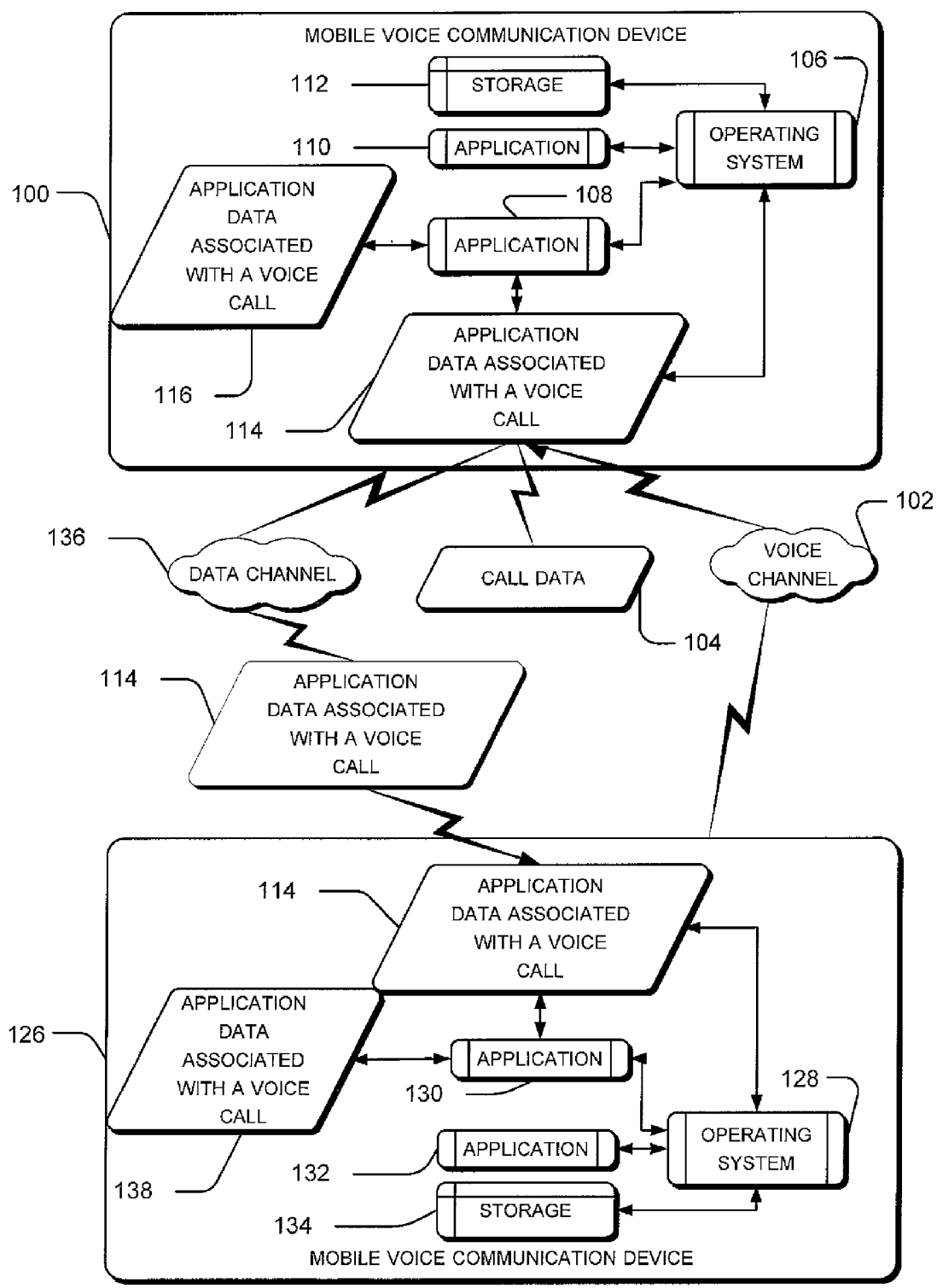
FIG. 3 is a block diagram showing a pair of mobile voice communication devices that share data associated with a voice call.

FIG. 3 is a block diagram showing a pair of mobile voice communication devices that share data associated with a voice call. The mobile voice communication devices, 100 and 126, manage both voice and data information.

Mobile voice communication device 100 has an open platform operating system (OS) 106, one or more application(s), 108 and 110, and storage 112. Mobile voice communication device 126 has an open platform operating system (OS) 128, one or more application(s), 130 and 132, and storage 134. Examples of applications 108, 110, 130, and 132 include a contact management system, an inventory management system, a tracking order system, a caller-ID management systems, and a personal information manager (PIM).

A voice call is initiated between mobile voice communication devices 100 and 126. During the voice call, mobile voice communication device 100 receives voice call data 104 through a cellular connection from a cellular network. Voice call data 104 includes identification information of mobile voice communication device 126. Mobile voice communication device 100 identifies application data 114 that is associated with the voice call data 104. In some embodiments, mobile voice communication device 100 identifies associated application data by determining whether such data is within the context of the voice call data 104.

The context is a set of common fact(s) or circumstance(s) that have a temporal relationship to a voice call. In this case, the context is determined by evaluating the time period of the voice call. Specifically, data having a particular temporal relationship with the voice call is deemed to be within the context of the voice call. Even more specifically, data that is open or accessed during, just prior to, and/or just after the voice call is deemed to be within the context of the voice call. In one scenario, a calendar manager application in mobile voice communication device 100 accesses scheduled appointment application data during a voice call with "Company X." The scheduled appointment application data is within the context of the voice call because it is within a temporal relationship of (i.e. during) the voice call.

Thereafter, in other embodiments, the application data 114 is associated with other application data 116 that is in overlapping context with application data 114. The association is made by application 108. In one scenario, application data such as a word processing file, includes data is within overlapping context as the scheduled appointment application data because the data in the word processing file includes a reference to "Company X" and the appointment application data is within a temporal relationship of a voice call to "Company X." Associating application data 114 with application data 116 by application 108 relieves the user of the burden of directing or manually performing the association.

Specific embodiments of associating application data includes linking or integrating. Linking includes providing pointers to the application data that connect the data. One example of an apparatus that integrates application data that is within a context of a voice call is described in FIG. 4.

In other embodiments, application data 114 is transmitted to mobile voice communication device 126 through a data channel 136. Mobile voice communication device 126 identifies application data 138 that is associated with the application data 114. In some embodiments, application data 114 is so identified by virtue of its being within the same context of the application data 138.

Thereafter, in other embodiments, the application data 114 is associated with application data 138 by application 130. Associating application data 114 with application data 138 by application 130 relieves a user of the voice communication device 126 of the burden of directing or performing the association.

Figure 4:
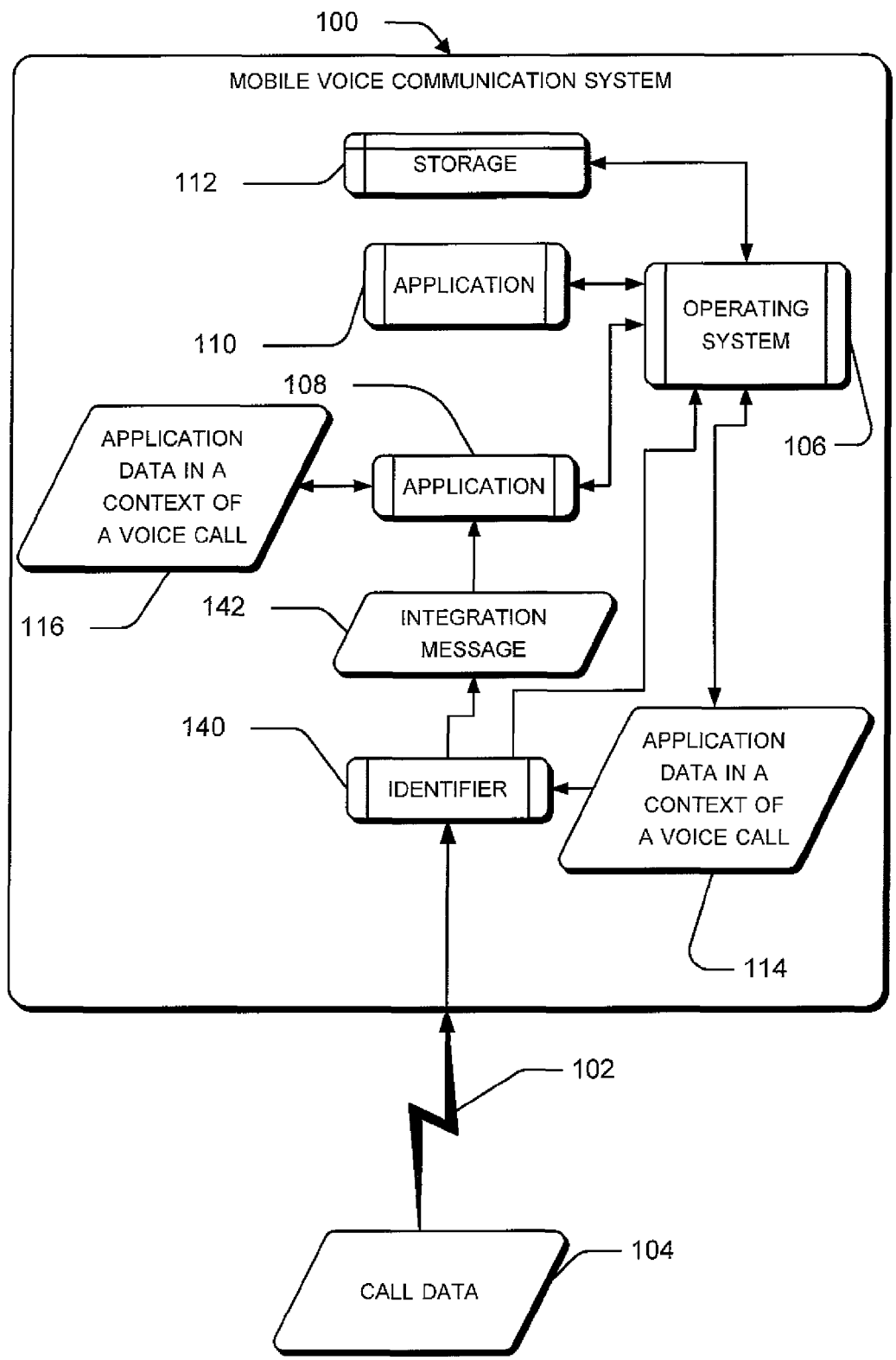
FIG. 4 is a more detailed block diagram of the mobile voice communication device that integrates data that is within a context of a voice call.

FIG. 4 is a more detailed block diagram of the mobile voice communication device 100 that integrates data that is within a context of a voice call. Mobile is voice communication device 100 has an open platform operating system (OS) 106, one or more application(s), 108 and 110, and storage 112.

Mobile voice communication device 100 also has an identifier 140. The identifier 140 receives voice call data 104. The identifier 140 identifies application data 114 and 116 that is within a context of the voice call data 104. In some embodiments, identifier 140 interacts with OS 106 to identify application data 114 and 116 that is within a context of the voice call data 104.

Application 108 is associated with, and manages application data 114 and 116. The identifier 140 provides a pointer to application data 114 and 116 to application 108. The identifier 140 also provides an integration message 142 to application 108 directing the integration of the application data 114 and 116. The message 142 identifies application data 114 and 116, and which of application data 114 and 116 to integrate into the other. Integrating includes inserting one application data into another application data. Integrating also includes updating one application data with another application data.

For example, in one scenario, mobile voice communication device 100 receives voice call data 104, such as voice call data identifying a voice call with an airline company. Either during the call or after the call, the mobile voice communication device 100 also receives the application data 114, such as an email containing information of a reservation with the airline company. Thereafter, either during the voice call or after the voice call, the identifier 140 determines that the application data 114 and 116 are both within a context of the voice call data 104. Henceforth, the identifier sends a pointer of application data 114 and 116 to application 108. The identifier 140 also provides a message 142 to is application 108 directing the integration of the application data 114 into application data 116.

An implementation of the system in FIG. 1 and the apparatus in FIG. 2-4 may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of a context management system may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of to information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Method

Figure 5:
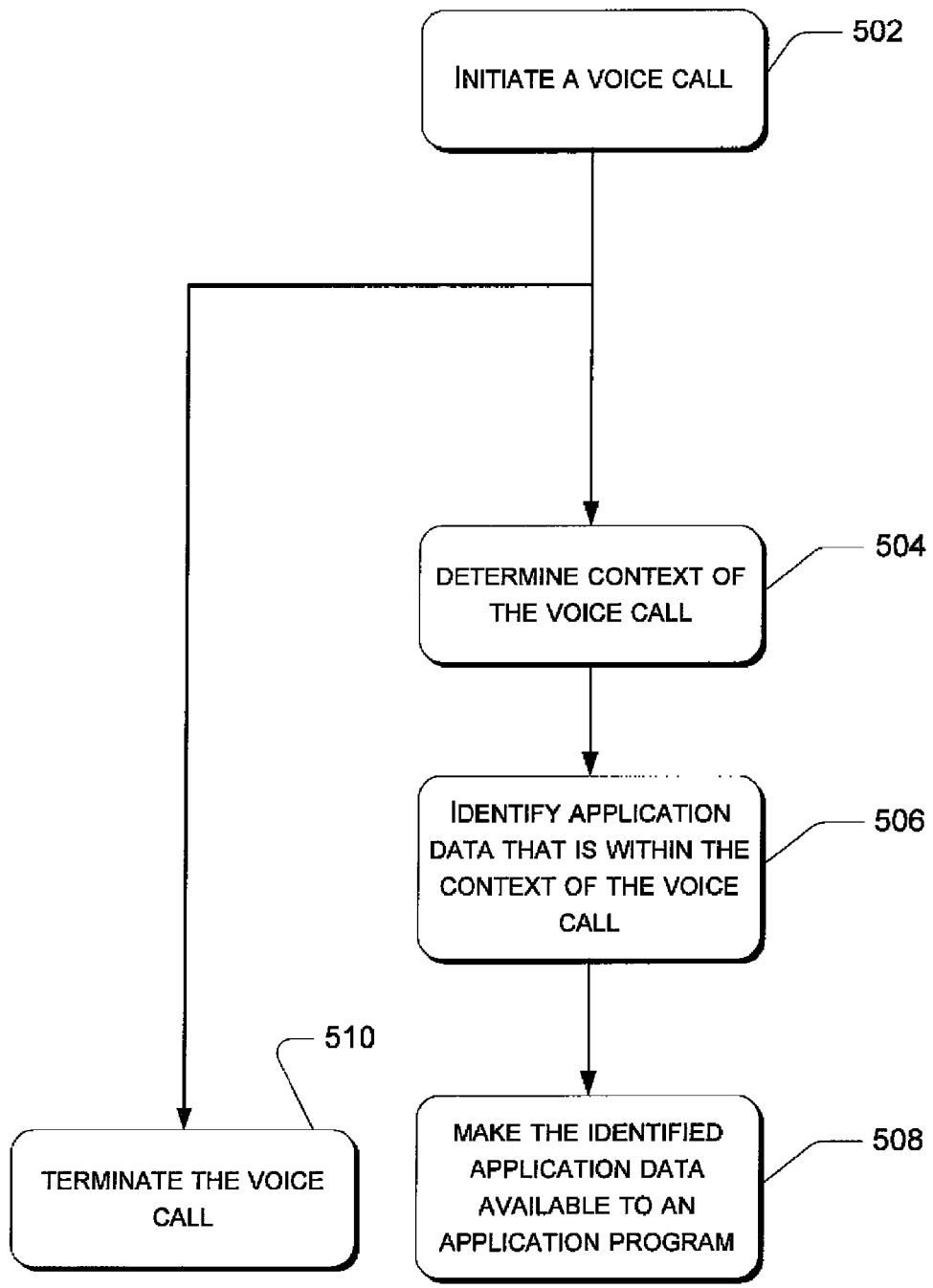
FIG. 5 illustrates a method for a system to leverage the value of application data in electronic commerce.

FIG. 5 illustrates a method for a system to leverage the value of application data in electronic commerce. The order in which the method is described is not intended to be construed as a limitation. Furthermore, the method can be implemented in any suitable hardware, software, firmware, or combination thereof.

At block 502, a voice call is initiated. The voice call is engaged or processed. The voice call is associated with voice call data. The voice call data includes an identity of a party engaged in the voice call, and/or a time and date of the voice call. The voice call data is also commonly known as "caller-ID" information.

The voice call has a context. The context is described above in conjunction with the overview in FIG. 1. At block 504, a context of the voice call is determined. The context is determined from voice call data, such as the identity and/or the date/time. The context may also be determined from data that is used, accessed, or opened within a predetermined time period of the voice call, and or from application programs. In some embodiments, the predetermined time period is heuristically determined based on information that the context is determined from. For example, the predetermined time period is shortened or lengthened from a previous state of the predetermined time period from data that is used, accessed, or opened within the predetermined time period of the voice call.

At block 506, application data that is within the context of the voice call is identified. Identifying application data that is within the context of the voice call allows the value of the application data to be leveraged. The identifying in block 506 is further described in FIG. 6.

At block 508, the identified application data is made available to at least one application program that operates within the context of the call. When the application data is made available, the application data can be associated by the application program with another application data that is within the same context. Thus, association between previously unlinked and unassociated application data is provided that would otherwise need to be associated pursuant to a series of actions of a human user.

Making the application data available in action 508 is an action that is independent of the termination of the voice call in block 510. The application data can be made available in action 508 before or after the voice call is terminated in block 510.

Figure 6:
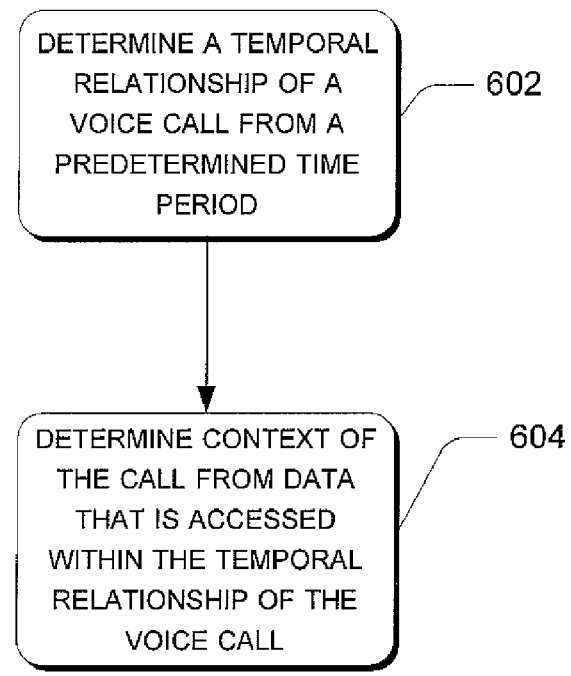
FIG. 6 illustrates a method to identify application data that is within a context of a voice call.

In one example of making the application data available in action 508, the application data that is identified as within the context of the call in action 506 or FIG. 6, is sent to an application program or component. The program or component is operable on an electronic device that manages data, such as a second electronic device.

In one example of making the application data available in action 508, an application program that is associated with the identified application data is invoked. The application program is invoked with a parameter directing the application program to operate on the identified application data. In a scenario where the application data is appointment schedule data and the application program is a calendar manager, the calendar manager is invoked with a parameter directing the application program to open or otherwise operate on the appointment schedule data. When the calendar manager is invoked, the calendar manager brings the appointment to the attention of a user, such by putting a focus of a graphical-user-interface (GUI) window on the appointment. In a scenario where the application data is a text document and the application program is a word processor, the word processor is invoked with a parameter directing the application program to open or otherwise operate on the text document. When the word processor is invoked, the word processor brings the text to the attention of a user, such by displaying the text in a graphical-user-interface (GUI) window and thus making the text available for editing by a user.

In embodiment of the method, determining the context of the voice call 504 and identifying application data is that is within the context of the voice call 506 is performed by the application program. The determining 504 and the identifying is performed after the application program is invoked, and while the application program is operating. In a scenario where the application data is appointment schedule data and the application program is a calendar manager, the calendar manager is invoked, and the application determines the context of a voice call and identifies appointment schedule data that is within the context. Then the calendar manager brings the appointment to the attention of a user, such by putting a focus of a graphical-user-interface (GUI) window on the appointment.

In a scenario where the application data is a text document and the application program is a word processor, the word processor is invoked, and the application determines the context of a voice call and identifies a text document that is within the context. Then the calendar manager brings the appointment to the attention of a user, such as by displaying the text in a graphical-user-interface (GUI) window and thus making the text available for editing by a user.

FIG. 6 illustrates a method to identify application data that is within a context of a voice call. FIG. 6 is one example of identifying application data that is within a context of a voice call in block 506 in FIG. 5.

At block 602 the temporal relationship of the call is determined from a predetermined time period. In one example, the predetermined time period is a time period during the voice call. In this example, the temporal relationship is limited to the duration of the voice call. In a second example, the predetermined time period is a time period after the termination of the voice call. In this second example, the temporal relationship of identifying the application data ends within a certain time period after the termination of the voice call. In a third example, the predetermined time period is a time period before the termination of the voice call. In this third example, the temporal relationship extends to a certain time period before the initiation of the voice call.

At block 604, the context of the call is determined from data that is open, accessed and/or used within the temporal relationship of the voice call. Examples of the data that is accessed within the temporal relationship of the voice call are calendar schedule data, word processing data, email data, credit card billing data, and/or travel reservation data. One further example of calendar schedule data is short-messaging-system (SMS) calendar data that is formatted according to a open standard of calendar information, such as RFC 2445 "Internet Calendaring and Scheduling Core Object Specification" (iCalendar) that was published by the Internet Engineering Task Force (IETF) in November 1998. The data may be accessed remotely through a network or locally.

In one scenario of the method, email application data having travel reservation data that is accessed within five minutes after the termination of a voice call is identified as within the context of the voice call. In another scenario, calendar schedule application data in iCalendar that is accessed during the voice call or within ten minutes after the termination of a voice call is identified as within the context of the voice call.

Conclusion

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system that conducts voice calls, each voice call having a context, the system comprising:
   a processor configured to execute a plurality of applications that process application data within the contexts of a voice call; and
   one or more components which are executable by the processor, the one or more components being configured to:
      receive voice call data during the voice call, the voice call data including caller identification and date and/or time data;
      determine the context of the voice call from a set of facts or circumstances that surround the voice call, wherein the context determination includes evaluating a timeframe in reference to a duration of the voice call;
      determine that a first application data and a second application data are both within an overlapping voice call context by determining that the first application data and the second application data are generated, opened, accessed or referenced during the timeframe;
      associate the first application data and the second application data by inserting the first application data into the second application data or by updating the first application data with the second application data.

2. The system as recited in claim 1, wherein the one or more components are further configured to associate the context with a globally unique identifier, and to send application data that is associated with the globally unique identifier to an application program that is associated with the globally unique identifier and to send an integration message to the application program that is associated with the globally unique identifier.

3. The system as recited in claim 1, wherein the context of the voice call is determined with reference to a location of a party associated with the voice call within a time period that begins before and ends after the voice call; and
   one or more of the components reference application data that is based on the location.

4. The system as recited in claim 1, wherein the context of the voice call is determined at least in part on a characteristic of a party associated with the voice call; and
   one or more of the components reference application data that is based on the characteristic.

5. The system as recited in claim 1, wherein
   the one or more components are further configured to determine the context based at least in part on an identity of a receiver and at least in part on data and an application program that are accessed during the voice call.

6. The system as recited in claim 1, wherein the one or more components are further configured to determine the context of the voice call at least in part from short-messaging-system calendar data formatted according to an open standard of calendar information that is accessed within a predetermined time period of the voice call, and at least in part from at least one operation on the short-messaging-system calendar data formatted according to an open standard of calendar information that is accessed within the predetermined time period of the voice call.

7. The system as recited in claim 1, wherein the first application data and the second application data reside on different systems.

8. A system to leverage the value of application data in electronic commerce comprising:
   a processor;
   a storage device coupled to the processor; and
   one or more components having computer-executable instructions stored on the storage device, the computer-executable instructions being executable by the processor to direct the system to perform operations comprising:
   conducting a voice call having a context;
   receiving voice call data during the voice call, the voice call data including caller identification and date and/or time data;
   determining a context of the voice call from a set of facts or circumstances that surround the voice call, wherein the context-determining includes an evaluation of a timeframe in reference to a duration of the voice call;
   identifying a first application data and a second application data that are both within the context of the voice call data by determining that the first application data and the second application data are generated, opened, accessed or referenced during the timeframe; and
   associating the first application data and the second application data by, at least in part, an insertion of the first application data into the second application data or an update of the first application data with the second application data.

9. The system as recited in claim 8, the operations further comprising:
   making the identified application data available to at least one application program that operates within the context of the voice call, and
   wherein the conducting and the making is performed by a first electronic device, and wherein the making further comprises sending application data that is within the context of the voice call to an application program operable on a second electronic device (126) that manages data, and wherein the conducting further comprises initiating the voice call to the second device.

10. The system as recited in claim 8, the operations further comprising:

initiating the voice call with a receiver, the receiver having an identity;
determining the context of the voice call, based at least in part on the identity of the receiver;
identifying an application program (108) that is associated with the first application data; and
sending the first application data to the application program that is associated with the first application data.

11. The system as recited in claim 8, the operations further comprising:
initiating the voice call with a receiver, the receiver having an identity;
determining the context of the voice call, based at least in part on the identity of the receiver;
identifying an application program that is associated with the first application data;
receiving the first application data from the receiver; and
sending the first application data to the application program that is associated with the first application data.

12. The system as recited in claim 8, the operations further comprising:
initiating the voice call with a receiver, the receiver having an identity;
determining the context of the voice call, based at least in part on the identity of the receiver;
associating the context with a globally unique identifier;
identifying an application program that is associated with the first application data;
receiving the first application data from the receiver; and
sending the first application data that is associated with the globally unique identifier to an application program that is associated with the globally unique identifier.

13. The system as recited in claim 8, the operations further comprising:
initiating the voice call with a receiver, the receiver having an identity;
determining the context of the voice call, based at least in part on the identity of the receiver and upon an application program and data that is accessed during and before the voice call;
identifying an application program that is associated with the first application data;
receiving the first application data from the receiver; and
sending the first application data to the application program that is associated with the first application data.

14. The system as recited in claim 12, wherein determining the context of the voice call further comprises:
determining the context of the voice call at least in part from calendar schedule data having a temporal relationship to the voice call; and
determining the context of the voice call at least in part from at least one operation on the calendar schedule data that is accessed within the predetermined time period of the voice call.

15. The system as recited in claim 12, wherein determining the context of the voice call further comprises:
determining the context of the voice call at least in part from word processing data having a temporal relationship to the voice call; and
determining the context of the voice call at least in part from at least one operation on the word processing data that is accessed within the predetermined time period of the voice call.

16. A method comprising:
initiating a voice call via an apparatus configured for voice-calling communications;
receiving voice call data during the voice call, the voice call data including caller identification and date and/or time data;
determining a context of the voice call from a set of facts or circumstances that surround the voice call, wherein determining the context comprises evaluating a timeframe in reference to a duration of the voice call;
identifying a first application data and a second application data that are both within the context of the voice call data by determining that the first application data and the second application data are generated, opened, accessed or referenced during the timeframe; and
associating the first application data and the second application data by at least in part inserting the first application data into the second application data or updating the first application data with the second application data.

17. The method as recited in claim 16, wherein the determining the context further comprises determining the context of the voice call at least in part from an identity of a party engaged in the voice call.

18. The method as recited in claim 16, wherein the determining the context further comprises:
determining the context of the voice call at least in part from remotely-addressed data that is accessed within a predetermined time period of the voice call; and
determining the context of the voice call at least in part from at least one operation on the remotely-addressed data that is accessed within the predetermined time period of the voice call.

19. The method as recited in claim 16 the method further comprising:
making the identified application data available to at least one application program that operates within the context of the voice call; and
terminating the voice call either after or before the making.

20. The method as recited in claim 16 the method further comprising:
making the identified application data available to at least one application program that operates within the context of the voice call, and
wherein the initiating and the making are performed by a first electronic device, and wherein the making includes sending application data that is within the context of the voice call to an application program operable on a second electronic device that manages data.

* * * * *